United States Patent [19]

Amacker

[11] Patent Number: 5,090,504
[45] Date of Patent: Feb. 25, 1992

[54] UNIVERSAL TREE STAND

[76] Inventor: Joseph A. Amacker, 1212 Main St., Delhi, La. 71232

[21] Appl. No.: 550,018

[22] Filed: Jul. 9, 1990

[51] Int. Cl.$^5$ .............................................. A47C 9/00
[52] U.S. Cl. ...................................... 182/134; 182/188
[58] Field of Search ............... 182/134, 135, 136, 187, 182/188, 152; 108/152

[56] References Cited

U.S. PATENT DOCUMENTS

| | | | |
|---|---|---|---|
| 3,340,828 | 9/1967 | Smith et al. | 182/187 X |
| 3,955,645 | 5/1976 | Dye. | |
| 4,137,995 | 2/1979 | Fonte | 182/135 |
| 4,331,216 | 5/1982 | Amacker. | |
| 4,452,338 | 6/1984 | Untz | 182/136 X |
| 4,802,552 | 2/1989 | Williams. | |

FOREIGN PATENT DOCUMENTS 264701 9/1913 Fed. Rep. of Germany ...... 182/188

*Primary Examiner*—Karen J. Chotkowski
*Attorney, Agent, or Firm*—Wigman & Cohen

[57] ABSTRACT

A compact, versatile tree stand includes a seating section having at least one pair of longitudinally side members supporting a seat and means for gripping a tree connected at one end of the side members. A cross member is provided so as to reversibly extend the seating section. The cross member may also be completely removed from the seating section. A foot supporting section has a rectangular frame which is divided into two frame sections. The two frame sections may be separated so that the frame can be reassembled for climbing and use as a tree stand or disassembled to reduce the length of the foot supporting section for transportation and storage. The seating section may also be used as a hand climber.

49 Claims, 5 Drawing Sheets

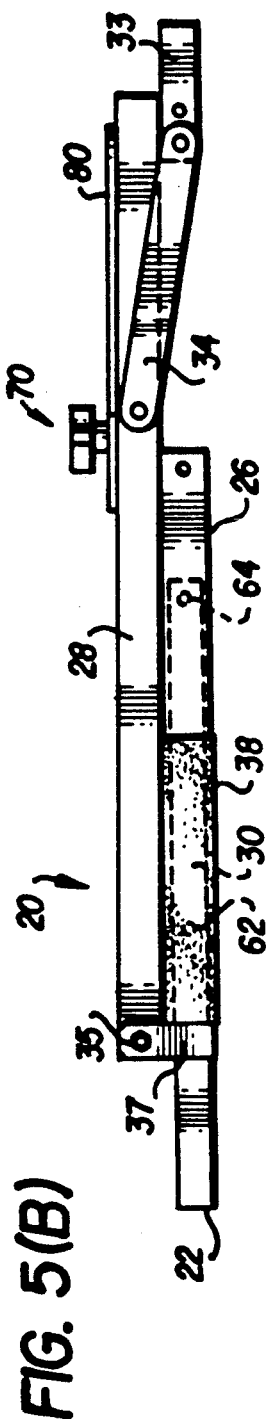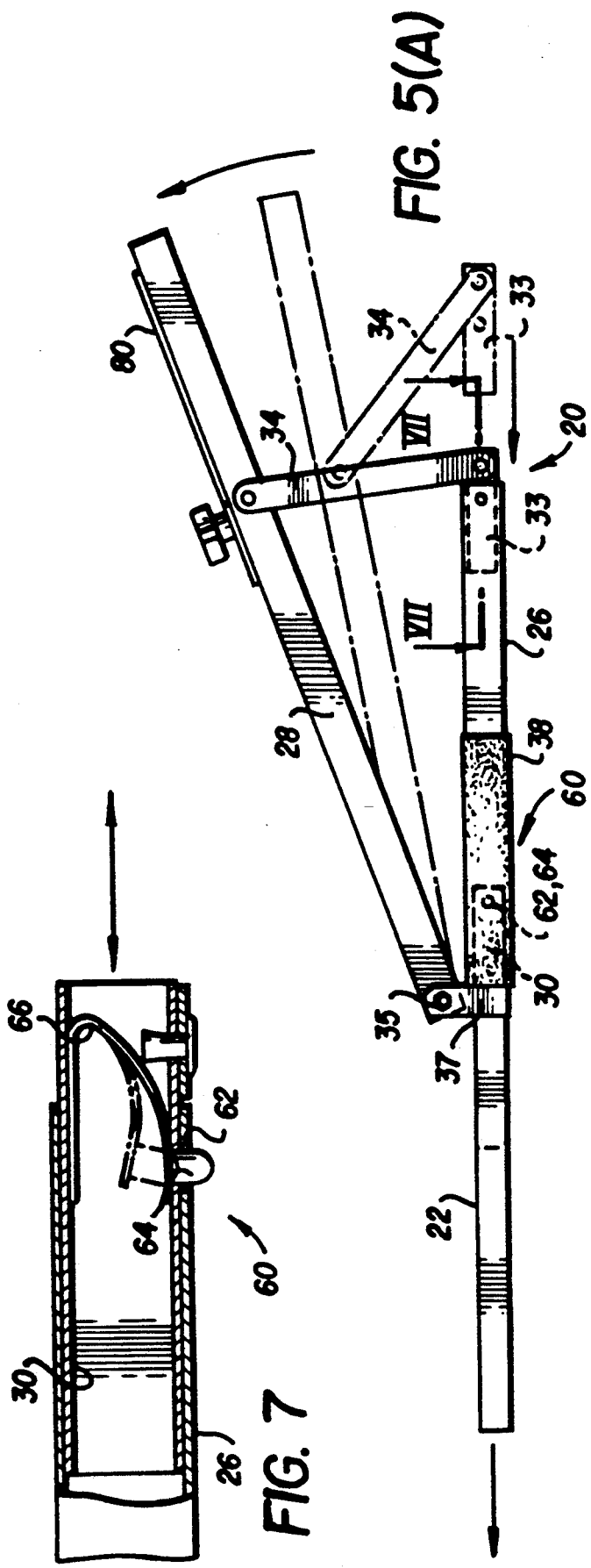

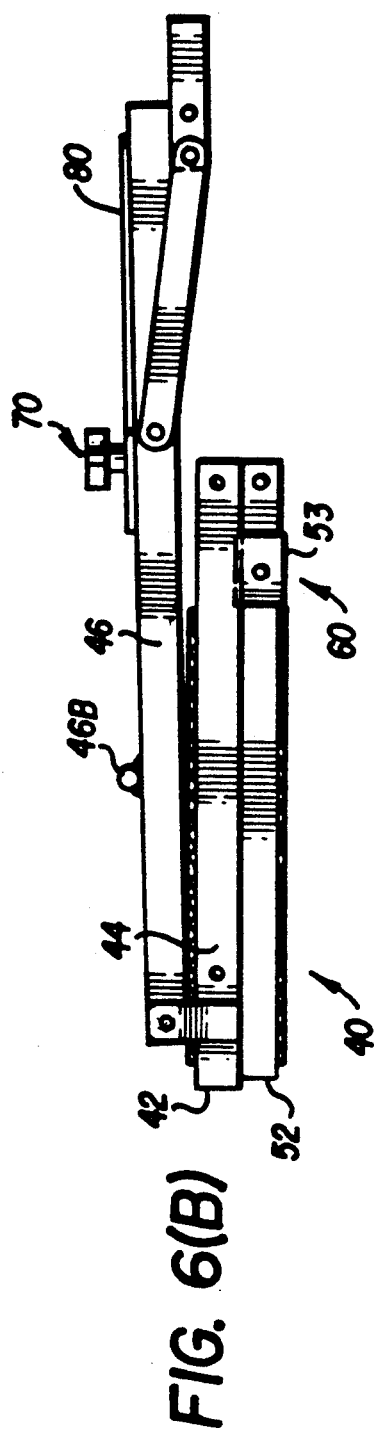
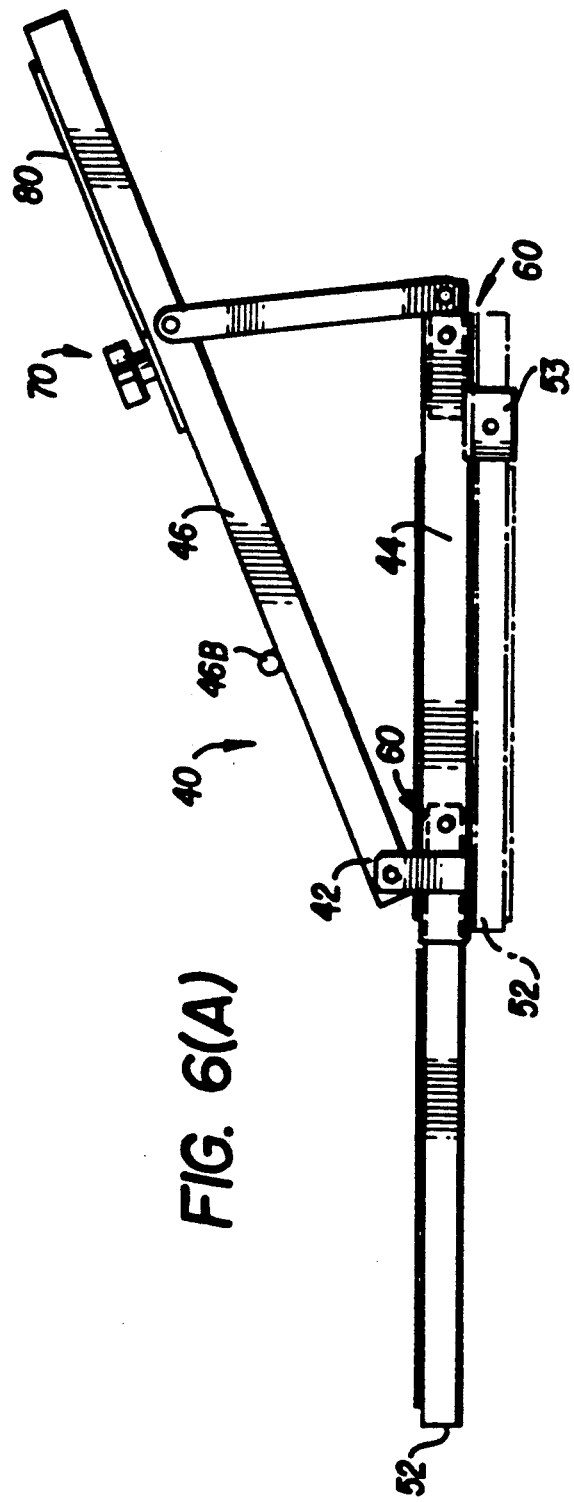
FIG. 6(B)
FIG. 6(A)

UNIVERSAL TREE STAND

FIELD OF THE INVENTION

The present invention relates to tree stands, and more particularly to a tree stand having improvements in both the climbing or seat supporting section and the platform or foot supporting section.

DESCRIPTION OF THE PRIOR ART

Tree stands, also known as tree climbing stands, are well known in the art, as illustrated by U.S. Pat. No. 4,331,216 to Amacker. As noted in the aforementioned Amacker patent, prior art tree stands have generally been considered to be of two basic types; those comprised of a single tree climbing frame or climber, and those which employ two climbing frames or elements. The Amacker patent describes a two-part tree stand which has an upper, climbing, or seating section and a lower, platform, or foot supporting section. The platform has a strong expanded metal mesh secured to a rigid frame for supporting the user when standing on the platform.

Other two-part tree stands are illustrated by U.S. Pat. No. 3,955,644 to Dye and U.S. Pat. No. 4,802,552 to Williams. These two patents are characterized by their use of the lower, climbing section as a seat support section and by their use of an extremely simple upper, climbing member which has no utility other than serving as a support for the arms of the user of the stand when the tree is being climbed.

Each of these tree stands, while they may be useful for the intended purpose, have the drawbacks of being long, relatively heavy, and confined to a limited manner of using the tree stands.

SUMMARY AND OBJECTS OF THE INVENTION

In view of the foregoing limitations and shortcomings of the prior art devices, as well as other disadvantages not specifically mentioned above, it should be apparent that there still exists a need in the art for a tree stand which is shorter, less cumbersome to use, lighter weight and more flexible than conventional tree stands.

It is, therefore, a primary object of this invention to fulfill that need by providing a tree stand which is compact.

More particularly, it is an object of this invention to provide a tree stand which, while being compact, is light in weight.

It is another object of this invention to provide a tree stand which is flexible in its construction so that it can perform the function of a number of models of tree stands currently on the market.

Yet another object of this invention is to provide a tree stand, which while being compact and light in weight is extremely sturdy in construction and safe to use.

Still another object of this invention is to provide a tree stand in which the upper or climbing section is adjustable as to its length.

A further object of the invention is to provide a tree stand in which the upper, climbing section is convertible from a seating section to a simple hand climber.

A further object of the invention is to provide a tree stand having a lower, foot supporting section which is capable of being reduced in length.

Yet a further object of the invention is to provide such a lower, foot supporting section which, while being compact in length, is readily transportable.

Briefly described, the aforementioned objects are accomplished according to the invention by providing a tree stand apparatus having a seating section which includes a pair of longitudinally extending side members, means for gripping a tree connected at one end of the side members, and a cross member adapted to be mounted to the opposite end of the side members. Means for mounting the cross member on the side members allow adjustment of the length of the cross member with respect to the side members to allow adjustment of the length of the tree stand. Additionally, the cross member may be completely removed from the side members, providing a simple apparatus which may be used as a hand climber, or, when used as a seating section allows freedom of movement of the seated user's legs. In this latter situation, means are provided for retaining the cross member on the seating section in a vertical orientation.

The aforementioned objects are further accomplished according to the invention by providing a tree stand foot supporting section having a generally rectangular frame and a foot supporting platform supported by said frame. The rectangular frame is divided into two frame sections, detachably connected with one another, so that the frame may be assembled for climbing and use as a tree stand, or disassembled to reduce the length of the foot supporting section for transportation and storage. Means are provided on one of the two sections for retaining and locking the two sections together in the disassembled state, thereby providing a compact unit for transportation and storage.

With the foregoing and other objects, advantages and features of the invention that will become hereinafter apparent, the nature of the invention may be more clearly understood by reference to the following detailed description of the invention, the appended claims and to the several views illustrated in the attached drawings.

BRIEF DESCRIPTION OF THE DRAWINGS

FIG. 5(A) is a side view of the seating section, with the cross member in its fully extended position for use on a tree.

FIG. 5(B) is a view similar to FIG. 5(A) illustrating the seating section in its collapsed, compact position.

FIG. 6(A) is a side view of the foot supporting section in assembled position ready for use on a tree.

FIG. 6(B) is a view similar to FIG. 6(A) illustrating the foot supporting section in collapsed position, ready for transport or storage.

FIG. 7 is a generalized cross-sectional view illustrating the means for telescoping locking of various frame elements.

DETAILED DESCRIPTION OF THE PREFERRED EMBODIMENTS

Figure 1A:
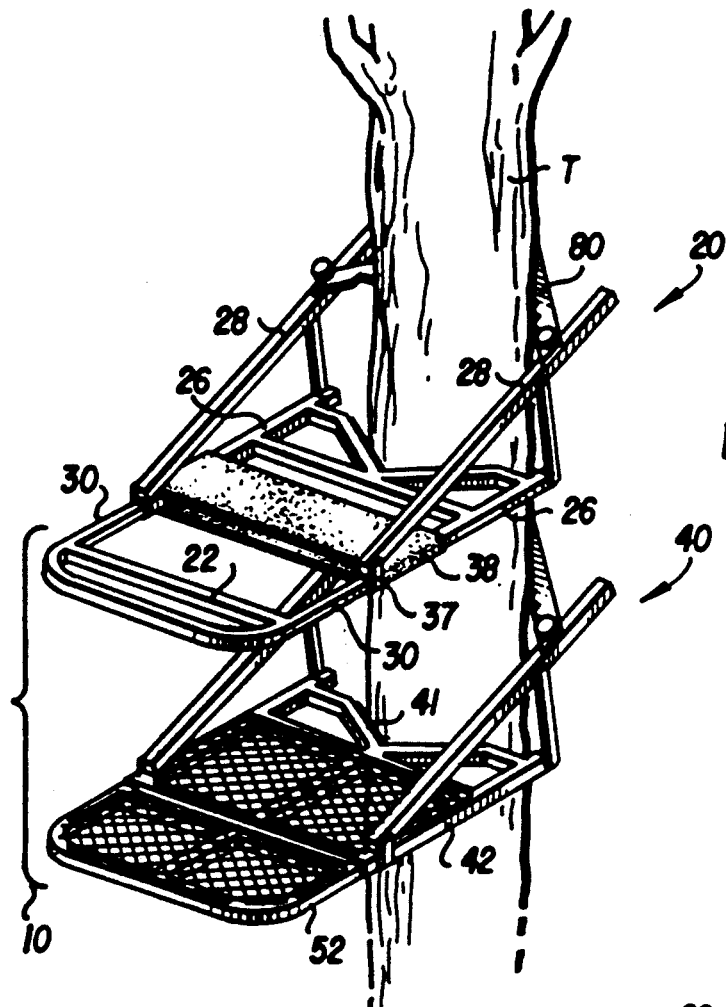
FIG. 1(A) is a perspective view of the seating section and foot supporting section of the tree stand in accordance with the present invention, positioned for use on a tree.

Referring now in detail to the drawings wherein like parts are designated by like reference numerals throughout, there is illustrated in FIG. 1(A) a tree stand which is designated generally by reference numeral 10, having an upper, climbing, seat supporting section generally designated by reference numeral 20, and a lower, foot supporting, platform section generally designated by reference numeral 40.

Upper, Climbing, Seating Section

Referring now to FIGS. 2, 3, 5(A), 5(B) in conjunction with FIGS. 1(A), 1(B), the upper, climbing, or seating section 20 will be described in greater detail.

Climbing or seating section 20 comprises a generally rectangular frame having a first pair of side members 26 which extend longitudinally away from the tree T when the seating section 20 is in use. Means for gripping tree T, in the preferred embodiment a V-shaped yoke 21, is securely fastened, such as by weldment, to one end of each of the side members 26. A cross member 22 is detachably connected with side members 26 so as to provide rigidity for the seating section 20 when a user is seated thereon.

More specifically, cross member 22 is formed from a piece of hollow tubular stock having a generally rectangular or square cross section, the tubular stock being bent at two places to form a U-shaped member having a base 24 and two longitudinally extending legs 30.

Figure 1B:
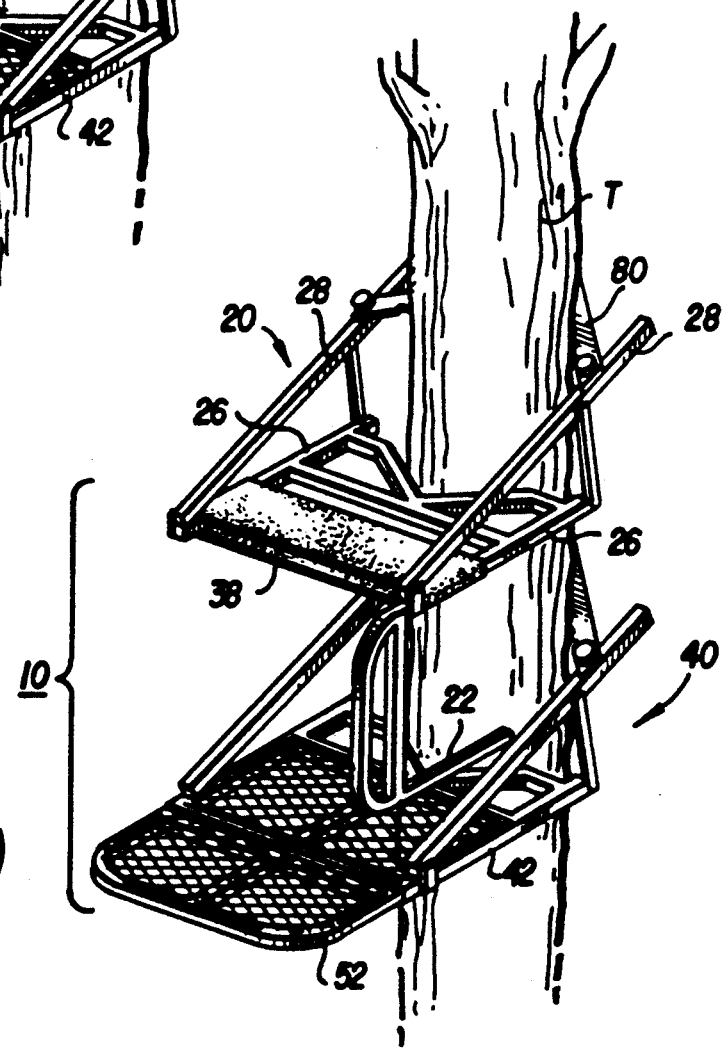
FIG. 1(B) is a perspective view similar to FIG. 1(A) in which the cross member of the seating section has been removed and replaced in a vertical orientation, in accordance with the invention.
Figure 3:
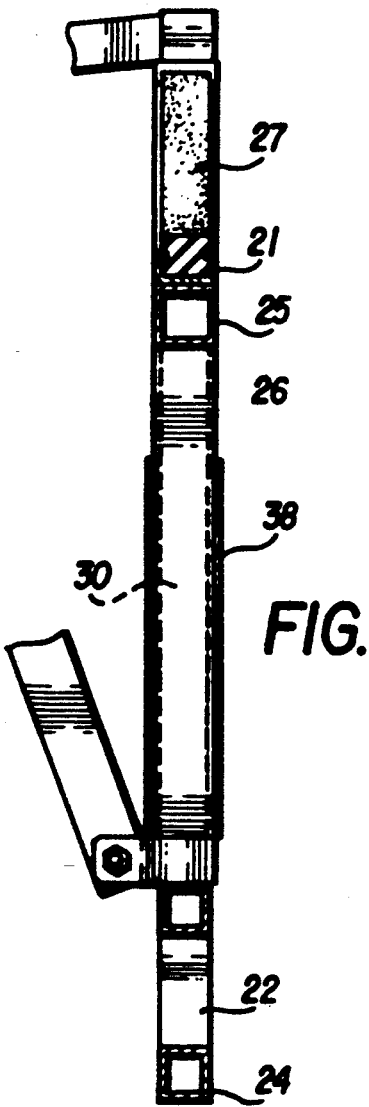
FIG. 3 is a sectional view taken along line III-III of FIG. 2.

As seen in FIGS. 1(A), 1(B) and FIG. 3, side members 26 are also formed from hollow tubular stock having a generally rectangular or square cross section, with the tubular stock being so dimensioned as to allow legs 30 of cross member 22 to fit telescopingly within side members 26.

Seating section 20 is provided with a seat 38 which supports the user in a seated position on the tree stand when in use, and also supports the user in a seated position when the tree stand is being climbed, with the user in a seated position facing away from the tree. In the illustrated embodiment, seat 38 is made from a sturdy piece of fabric material, such as canvas, which has been stretched over the two side members 26, and with the ends of the fabric being firmly stitched together, so as to provide a unitary seating structure. This fabric seat 38 allows for an extremely right weight, yet sturdy and durable seat for the seating section. Of course, it will be apparent to those skilled in the art that any conventional type of seat may be readily used. in connection with seating section 20, such as, for example, the seat illustrated in my copending U.S. Pat. application Ser. No. 07/336,793 (Notice of Allowance issued June 6, 1990, U.S. Pat. No. not yet assigned).

In accordance with the invention, means are provided on cross member 22 and side members 26 for locking cross member 22 on seating section 20 when the cross member 22 is fully extended for use, as illustrated in FIGS. 1(A) and 5(A).

The locking means provided on cross member 22, generally designated by reference numeral 60 in FIG. 5(A) and as most particularly shown in FIG. 7, comprises a set of corresponding apertures 62,64 located in one of side members 26 and one of legs 30 of cross member 22. Locking means 60 also includes a unitary push spring 66 such as Valco (of Cleveland, Ohio) No. 0183-250, which is a one-piece U-shaped member in which the pin is integrally formed in one end of the spring. The spring may thus be readily inserted and removed from within the telescoping tubular members. Such a locking means is more fully described in my aforementioned U.S. Pat. application Ser. No. 07/498,401, and is incorporated herein by reference.

Cross member 22 may also be provided with an additional cross bar or cross support piece 23, disposed perpendicularly to legs 30 and parallel to base 24 and firmly connected to each of legs 22, such as by weldment, in the vicinity of base 24. Cross bar 23 provides additional rigidity for cross member 22 thereby further improving the safety of seat supporting section 20.

In a similar fashion, a yoke support bar 25 extends between side members 26, perpendicularly thereto, and firmly secured such as by weldment to both of side members 26 as well as to V-shaped yoke 21. A strip of hard rubber cushioning material 27 may be applied to the side of yoke 21 which engages the tree, thereby protecting the tree in compliance with ecological principles and applicable state laws. Of course, it will be appreciated by those skilled in the art, that a variety of means of protecting the tree may be employed in the yoke of the present inventive apparatus, consistent with the scope of the invention.

Also provided as an aid for both climbing and firm support on the tree are an additional pair of side members 28. At one end thereof, side members 28 are pivotally mounted to side members 26. This pivotal mounting may be done in a variety of ways, but, in the preferred embodiment is performed by the use of a relatively small but sturdy plate 37 (FIG. 5A) which is firmly secured, as by weldment, to one end of each side member 26 and pivotally mounts one end of each side member 28, as by means of a nut and bolt connection 35.

At a location on side members 28 which is more proximate the tree gripping means, one end of a strut 34 is firmly yet pivotally connected, as by means of a rivet, to each of side members 38. The other end of strut 34 is similarly pivotally connected to a relatively short rectangularly cross section tubular member 33. Tubular member 33 and the end of side member 26 at which the tree gripping means is located are provided with locking means similar to locking means 60 illustrated in FIG. 7. Since the locking means for tubular members 33 and side members 26 have been previously explained in great detail, no further explanation is necessary at this point.

Figure 8:
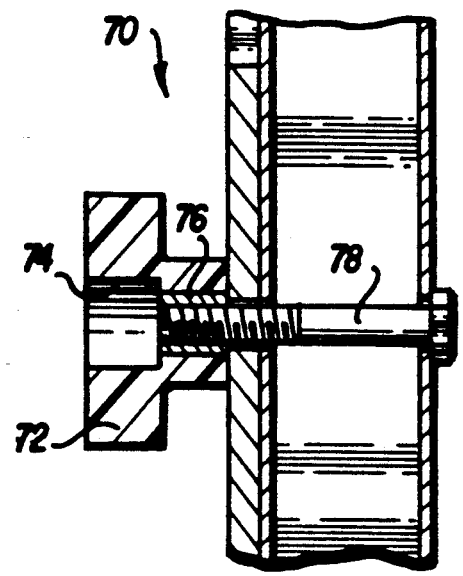
FIG. 8 is a generalized cross-sectional view illustrating the manner in which a tree-gripping blade is attached to the tree stand sections.

Finally, side members 28 of seating section 20 are provided with additional means for gripping a tree in the form of a blade 80. Blade 80 may be any one of a number of known blades, and, in the illustrated embodiment, is a V-shaped flat piece of stock metal which has been provided with serations on the inside surface of the V-shape and with apertures at the ends of the V for mounting to the side members 38. Blade 80 is adjustably mounted on side members 28 by mounting means 70, illustrated in detail in FIG. 8 in conjunction with FIG. 2.

Adjustable mounting means 70 include an easy-grip plastic knob 72 having a stepped recess 74 in which a threaded metallic insert 76 is press fit. A standard threaded bolt 78 is engagable with threaded insert 76 through adjustment apertures located at the tree gripping ends of side members 28 so as to provide a secure, yet adjustable connection of blade 80 to seating section 20.

It will be appreciated that any known means may be used for securing blade 80 to seating section 20. It should also be noted that blade 80 may be provided with a suitable coating such as rubber or plastic in order to provide an environmentally sound tree gripping means which is consistent with state laws.

Lower, Platform, Foot Supporting Section

Figure 4:
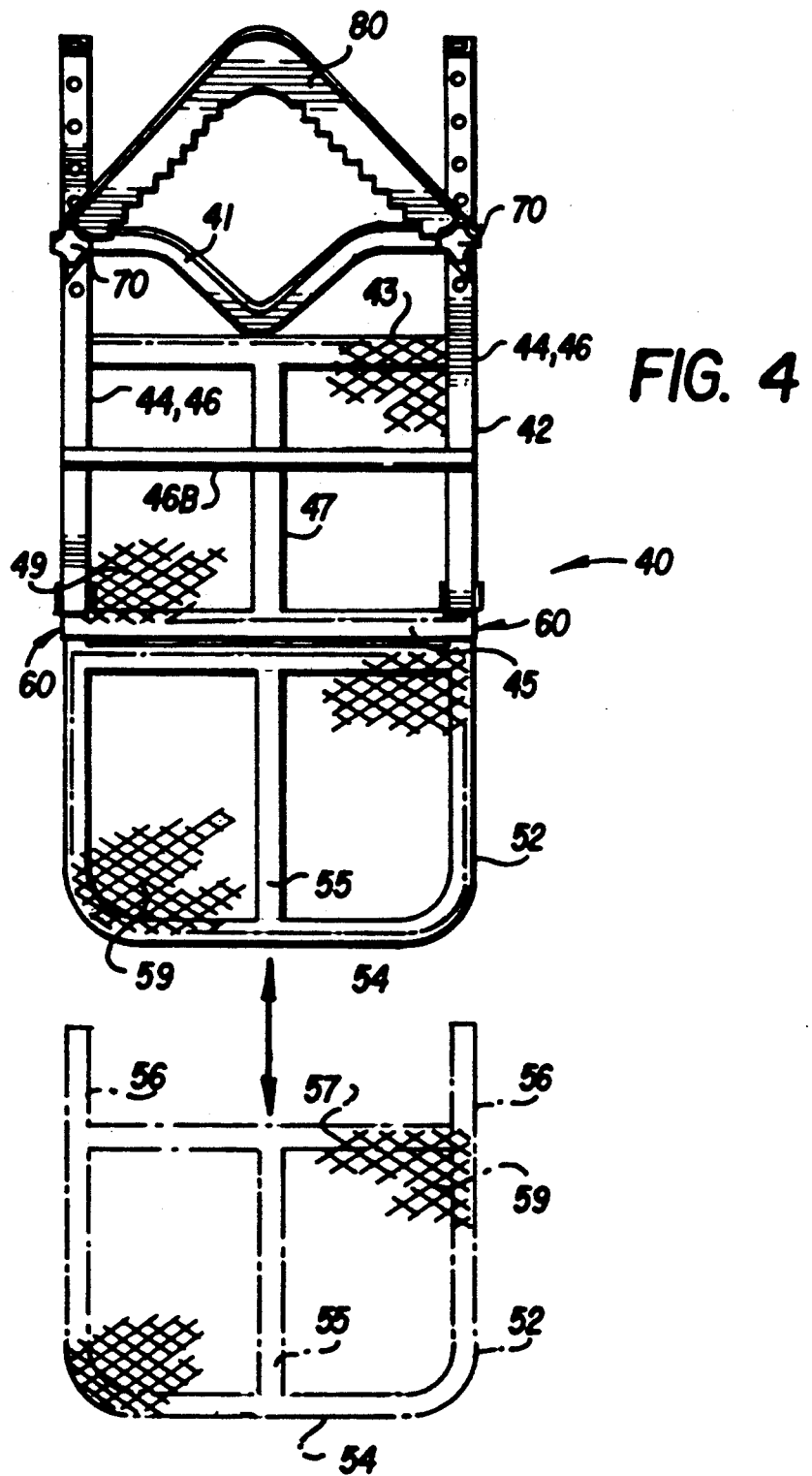
FIG. 4 is a plan view of the lower, foot supporting, platform section in accordance with the invention.

Referring now to FIGS. 4, 6(A), 6(B) in conjunction with FIGS. 1(A), 1(B), the lower, platform, or foot supporting section 40 will be described in greater detail.

Platform or foot supporting section 40, similarly to seating section 20, comprises a generally rectangular frame. Foot supporting section 40 is divided into two frame sections 42 and 52.

Frame section 42 includes two longitudinally extending rectangularly cross section shaped tubular side members 44. Means for gripping tree T are provided at one end of side members 44, which, in the preferred embodiment, takes the form of a V-shaped yoke 41 which has substantially the same construction as yoke 21 previously described in connection with the upper section 20. V-shaped yoke 41 is firmly connected to the one end of side members 44 such as by means of weldment, and is similarly connected at the point of the V to a cross support bar 43 which extends perpendicularly to side members 44 and is also firmly connected thereto as by weldment, so as to provide structural rigidity for the tree gripping means associated with side members 44. An additional cross support bar 45 is perpendicularly disposed between side members 44 and similarly firmly connected thereto at the ends of side members 44 opposite the tree gripping means. According to this arrangement, great structural rigidity and safe platform support are provided in the frame section 42.

Foot supporting section 40 is provided with means for detachably connecting frame sections 42 and 52 with one another, so that the frame may be assembled for climbing and use as a tree stand, and may also be disassembled to reduce the length of the foot supporting section for transportation and storage. Also, means are provided for locking the assembled sections in position when the frame is in use, and for holding the disassembled sections together as a unit when transported or stored.

Frame section 52, similarly to cross member 22 of foot supporting section 20, is formed from hollow tubular stock having a generally rectangular or square cross section, the tubular stock being bent at two places to form a U-shaped member having a base 54 and two longitudinally extending legs 56.

Also, as seen in FIGS. 1(A), 1(B) and FIG. 4, side members 44 are formed from hollow tubular stock with the tubular stock being so dimensioned so as to allow legs 56 of frame member 54 to fit telescopingly within side members 44.

In accordance with the invention, means are provided on frame section 52 and side members 44 for locking frame section 52 on foot supporting section 40 when the frame section 52 is assembled for use, as illustrated in FIGS. 1(A), 1(B), 4 and 6(A).

The locking means, generally designated by reference numeral 60 in FIGS. 4 and 6(A) and most particularly in FIG. 7, comprises a set of corresponding apertures 62,64, located in one of each of side members 44 and one of legs 56 of frame section 52. Locking means 60, one of each of which is provided on each of frame sections 42,52 of section 40, are identical with that earlier described in connection with section 20.

While it will be appreciated that the locking means 60 are provided in the preferred embodiment on only one side of seating section 20 for convenience in use of the seating section and two locking means 60 are provided on foot supporting section 40, in order to ensure a secure and safe connection of the two frame sections of the foot supporting section, it will be appreciated by those skilled in the art that any combination of locking means 60, such as the provision of a single locking means on one or the other sides of the seating section and frame section, or two locking means, one on each side of either the seating section or foot supporting section may be provided, consistent with the scope of the invention.

Frame section 52 is also provided with an additional cross bar or cross support piece 57, disposed perpendicularly to legs 56 and parallel to base 54 and firmly connected to each of legs 56, such as by weldment, spaced apart from base 54. A longitudinal support bar 55, disposed parallel to legs 52, substantially equidistantly therebetween, is similarly firmly connected to base 54 and cross bar 57. Cross bar 57 and longitudinal support bar 55 provide additional rigidity thereby improving the safety of foot supporting section 40.

Similarly, frame section 42 is provided with a longitudinal support bar 47 connected in a manner similar to longitudinal support bar 55 to provide additional rigidity to frame section 42.

Each of frame sections 42 and 45 are provided with an expanded metal mesh 49,59, respectively, to provide the platform for the tree stand user, as is known in the art.

Also provided on frame section 42 as an aid for both climbing and firm support on the tree are an additional pair of side members 46. Similar to the additional pair of side members 28 of seating section 20, side members 46 are pivotally mounted to side members 44 by means of a sturdy plate and pivotal nut and bolt connection (unnumbered). Strut, tubular members and locking means 60 identically with those described and illustrated hereinabove with respect to the seating section are provided for side members 44 and 46 of foot supporting section 40. Since the pivotal connection and strut collapsing construction of foot supporting section 40 is identical with that of seating section 20, it is not necessary to describe these elements in further detail.

Similarly, additional means for gripping the tree T in the form of a blade 80 and adjustable mounting means 70 are provided on side members 46.

Further in accordance with the invention, foot supporting section 40 is provided with holders 53, one of each of which is welded to the underside of side members 44, which, in the preferred embodiment, are proximate the ends of the side members connected to yoke 41. Holders 53 are formed from tubular rectangularly cross section shaped stock similar in dimension to side members 44. Holders 53 are provided with apertures in order to receive the free ends of legs 56 enabling locking means 60 to lock legs 56 to the holders, thereby locking frame elements 42 and 45 together as a unit for ready transportation and convenient storage.

Tree Stand Operation

Referring once again to FIG. 1(A), the tree stand 10 is illustrated in climbing and use position on the tree T. In this position, seating section 20 is in its fully extended state, with cross member 22 assuming the position illustrated in phantom arrow E of FIG. 2 and in the full line position illustrated in FIG. 5(A). Further, in this extended, use- position, locking means 60 is fully engaged, insuring that cross member 22 is securely held on side members 26. Further, foot supporting section 40 is in its assembled position, illustrated in full line in FIG. 4 and in full line in FIG. 6(A). In this position, locking means 60 are also engaged so that sections 52 and 42 are securely held to form a safe platform. In this condition, the tree stand 10 can be used as a sitting tree stand or the stand may be used to climb up and down the tree in a "sit-down" manner using bail 46B as is known in the art.

Referring now to FIG. 1(B), tree stand 10 is shown in the position in which cross member 22 has been completely removed from side members 26, rotated 90° downwardly, and then inserted into one of the hollow tubular side members 26, so that cross member 22 assumes a vertical orientation, yet is still secured to the seating section 20. In this arrangement, the user can easily stand without any impediment from cross member 22. This condition is extremely desirable for the archer or bow hunter who desires to lean forward. Also in this condition, a seated user of tree stand 10 will be free to swing his or her legs without interference from cross member 22, thereby providing an extremely comfortable seat.

Figure 2:
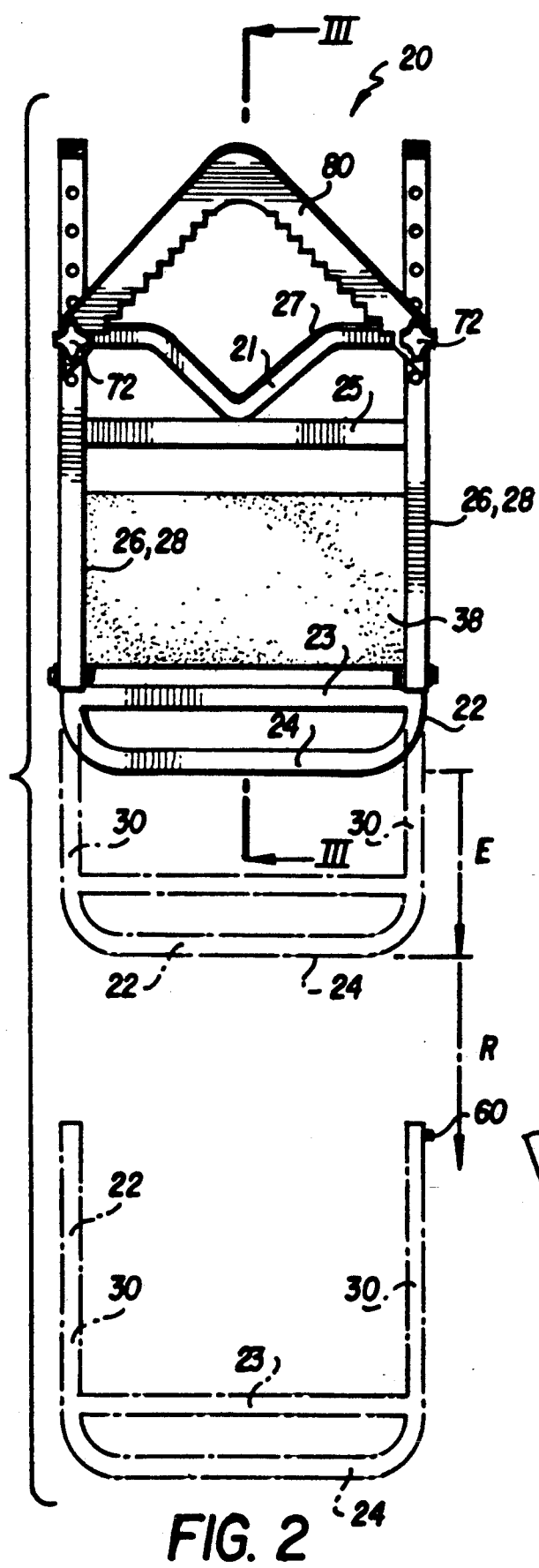
FIG. 2 is a plan view of the upper, climbing, seating section in accordance with the invention.

By way of further explanation, reference is made to FIG. 2 in which cross member 22 is shown completely removed from side members 26 in the position of phantom arrow R.

When the user has descended from the tree, and it is desired to disassemble the tree stand for transportation and eventual storage, each of the two sections 20,40 are reduced in length and collapsed.

Referring specifically to FIG. 2, it will be seen that cross member 22, as illustrated in the full line position, has been telescopically reduced in length by releasing locking means 60 and sliding cross member 22 toward the tree gripping end of the seating section 20.

Referring to FIG. 5(B) in conjunction with FiG. 5(A), it will be seen that section 20 is not only reduCed in length but is collapsed, locking means 60 retaining members 33 on side members 26 having been released, and struts 34 having been pivoted on both side members 26 and members 33. This operation is illustrated in phantom in FIG. 5(A).

Similarly, foot supporting section 40 is first reduced in length by detaching frame sections 42 and 52, as illustrated in phantom in FIG. 4.

Referring now to FIG. 6(B), the seat supporting section is shown in its disassembled, collapsed state, in which frame section 52 is carried by and locked in holder 53 for transportation and storage. This condition is reached by releasing locking means 60 connecting frame sections 42 and 44, illustrated in full line in FIG. 6(A), then removing frame section 52 and positioning it in the phantom position illustrated in FIG. 6(A). Additionally, side members 46 are pivoted from the position shown in FIG. 6(A) to that shown in FIG. 6(B) in a manner similar to that described with respect to side members 28 of seating section 20 in FIGS. 5(A) and 5(B).

The two compact, collapsed sections 20 and 40 may then be tied or bundled together as a unit or kept separated, at the convenience of the user, for transportation and eventual storage.

In a preferred construction, the length of the upper and lower sections can be shortened by the present invention from about 42 or 44 inches in its fully extended condition (similar to other, more conventional stands) to about 32 inches when the removable sections 20,40 are removed.

Hand Climber Operation

Referring now to FIGS. 1(B) and 2, it will be seen that it is possible to readily remove cross member 22 from upper, climbing, seating section 20. As particularly illustrated in FIG. 2 in the position of phantom arrow R, the remaining section 20, cross member 22 having been removed, is particularly adapted for use as a hand climber. When section 20 is used as a hand climber, the function of which is well known in the art, section 20 may either be used by itself, in which case the user "skinnies" up the tree or may be used in conjunction with a foot supporting section such as foot supporting section 40, in the fashion illustrated in the aforementioned Dye and Williams patents.

In accordance with the invention, then, the described apparatus has a great versatility of use and performs the function of at least seven different models of tree stands currently on the market.

It will also be apparent that although it is contemplated that the upper or climbing section 20 will be used together with the lower or foot supporting section 40, each of the sections may be used separately, or, with other conventional tree stand devices. For example, the lower section 40 may be used with hand climbers other than the hand climber 20 of the present invention.

Although certain presently preferred embodiments of the invention have been described herein, it will be apparent to those skilled in the art to which the invention pertains that variations and modifications of the described embodiment may be made without departing from the spirit and scope of the invention. Accordingly, it is intended that the invention be limited only to the extent required by the appended claims and the applicable rules of law.

What is claimed is:

1. A tree stand climbing apparatus comprising:
   a climbing section including a seating section;
   said setting section including a seat and a pair of lower side members extending lengthwise and providing lateral support for said seat;
   means for gripping a tree connected at one end of said lower side members;
   an upper pair of side members including additional means for gripping a tree connected at one end of said upper pair of side members, said upper and lower pairs of side members being pivotally connected to permit movement to a collapsed condition when not in use;
   a pair of locking members for maintaining said pairs of upper and lower side members in angular and secured relation when in use;
   a generally U-shaped cross member removably positioned on the end of said lower side members opposite the gripping means; and
   said generally U-shaped cross member being telescopically connected to said lower side members such that the cross member extends said lower side members when in position either fully or partially, and may be completely and readily removed from contact with the side members thereby permitting said user to either stand or sit without interference from said cross member.

2. The tree stand apparatus of claim 1 further comprising a foot supporting section;

said foot supporting section having a generally rectangular frame and a foot supporting platform supported by said frame, said rectangular frame being divided into two frame sections;

means for gripping a tree connected to one end of said rectangular frame; and means carried by said frame permitting separation of said two sections, whereby the frame may be reassembled for climbing and use as a tree stand, and disassembled to reduce the length of said foot supporting section for transportation and storage.

3. A tree stand comprising:

a seating section;

said seating section including at least one pair of side members extending lengthwise and providing lateral support for the seat;

means for gripping a tree connected at one end of said at least one pair of side members;

means connected with said seating section for selectively extending and contracting said seating section;

wherein said seat extending means comprise a cross member adapted to be mounted on the opposite end of said at least one pair of side members;

means for mounting said cross member on the opposite end of the at least one pair of side members such that the cross member may be firmly connected to each of the pair of side members at an extended position, the cross member may be moved on the at least one pair of side members into a collapsed position, decreasing the length of the seating section, and may be completely and readily removed from contact with the side members; and a foot supporting section;

said foot supporting section having a generally rectangular frame and a foot supporting platform supported by said frame, said rectangular frame being divided into two frame sections;

means for gripping a tree connected to one end of said rectangular frame; and means carried by said frame permitting separation of said two sections, whereby the frame may be reassembled for climbing and use as a tree stand, and disassembled to reduce the length of the foot supporting section for transportation and storage;

thereby providing a tree stand which is readily assembled for use, and which is readily disassembled into a compact arrangement for transportation and storage.

4. The tree stand apparats of claim 3 wherein said at least one pair of side members comprises rectangularly shaped tues and said cross member comprises a U-shaped member having a base and rectangularly shaped tubular legs, said legs being adapted to fit telescopingly within said side members.

5. The tree stand apparatus of claim 3 wherein said means for mounting said cross member on said at least one pair of side members includes corresponding apertures formed in said side members and the legs of said cross member, and a spring biased pin releasably protruding from said apertures; and said cross member further includes a cross bar securely joined between the legs of the U-shaped member in close proximity to the base of the U-shaped member so as to provide additional rigidity to said cross member.

6. A tree stand apparatus of claim 3 further comprising an additional pair of side members, additional means for gripping a tree connected at one end of said additional pair of side members, each of the side members of said additional pair of side members being pivotally connected at the opposite end of said additional pair of side members to one of the opposite ends of the side members of said at least one pair of side members.

7. The tree stand apparatus of claim 6 including means for angular adjustment of the at least one pair of side members and the additional pair of side members with respect to one another between an expanded position in which the two pairs of side members are angularly disposed with respect to one another for climbing and use as a tree stand, and a collapsed position in which the two pairs of side members lie side by side for transporting and storing the tree stand apparatus.

8. The tree stand apparatus of claim 7 wherein the angular adjustment means comprises a pair of telescoping members for telescopic engagement within the one end of the at least one pair of side members and a pair of struts pivotally connected at one end to said pair of telescoping members and at the other end to said pair of additional side members.

9. The tree stand apparatus of claim 8 further comprising means for locking said two pairs of side members in said expanded position.

10. The tree stand apparatus of claim 9 wherein said locking means comprises corresponding apertures on said pair of telescoping members and said at least one pair of side members, and a spring-biased pin protruding from said apertures.

11. The tree stand apparatus of claim 3 wherein said tree gripping means includes a generally V-shaped yoke firmly connected to and extending between said at least one pair of side members.

12. The tree stand apparatus of claim 11 wherein a yoke support bar is provided, firmly connected to and extending between said at least one pair of side members and also firmly connected to said yoke to provide additional rigidity for said tree gripping means.

13. The tree stand apparatus of claim 6 wherein the additional tree gripping means comprises a. V-shaped bar adjustably connected to said additional pair of side members at said one end of said additional pair of side members.

14. The tree stand apparatus of claim 3 further including a foot supporting section for supporting the feet of a user during climbing and use of said tree stand apparatus.

15. The tree stand apparatus of claim 3 further comprising means for retaining the cross member in a vertical orientation on the tree stand apparatus after the cross member has been removed from the position extending between said side members, whereby the cross member does not interfere with the feet of a user seated on the tree stand apparatus.

16. The tree stand apparatus of claim 15 wherein said at least one pair of side members comprises rectangularly shaped tubes and said cross member comprises a U-shaped member having a base and rectangularly shaped tubular legs, said legs being adapted to fit telescopingly within said side members.

17. The tree stand apparatus of claim 16 wherein said means for mounting said cross member on said at least one pair of side members includes corresponding apertures formed in said side members and the legs of said cross member, and a spring biased pin releasably protruding from said apertures.

18. The tree stand apparatus of claim 16 wherein said cross member further includes a cross bar securely joined between the legs of the U-shaped member in close proximity to the base of the U-shaped member so as to provide additional rigidity to said cross member.

19. The tree stand apparatus of claim 3 further comprising an additional pair of side members, additional means for gripping a tree connected at one end of said additional pair of side members, each of the side members of said additional pair of side members being pivotally connected at the opposite end of said additional pair of side members to one of the opposite ends of the side members of said at least one pair of side members.

20. The tree stand apparatus of claim 19 including means for angular adjustment of the at least one pair of side members and the additional pair of side members with respect to one another between an expanded position in which the two pairs of side members are angularly disposed with respect to one another for climbing and use as a tree stand, and a collapsed position in which the two pairs of side members lie side by side for transporting and storing the tree stand apparatus.

21. The tree stand apparatus of claim 20 wherein the angular adjustment means comprises a pair of telescoping members for telescopic engagement within the one end of the at least one pair of side members and a pair of struts pivotally connected at one end to said pair of telescoping members and at the other end to said pair of additional side members.

22. The tree stand apparatus of claim 21 further comprising means for locking said two pairs of side members in said expanded position.

23. The tree stand apparatus of claim 21 wherein said locking means comprises corresponding apertures on said pair of telescoping members and said at least one pair of side members, and a spring-biased pin protruding from said apertures.

24. The tree stand apparatus of claim 23 wherein said tree gripping means includes a generally V-shaped yoke firmly connected to and extending between said at least one pair of side members.

25. The tree stand apparatus of claim 24 wherein a yoke support bar is provided, firmly connected to and extending between said at least one pair of side members and also firmly connected to said yoke to provide additional rigidity for said tree gripping means.

26. The tree stand apparatus of claim 19 wherein the additional tree gripping means comprises a V-shaped bar adjustably connected to said additional pair of side members at said one end of said additional pair of side members.

27. The tree stand apparatus of claim 3 wherein said two frame sections comprise:
  a first frame section which is connected to the tree gripping means at one end of said first frame section, said first frame section having at least one pair of side members each of which side members is formed as a rectangularly shaped tube which is open at the opposite end; and
  a second frame section having a pair of side members adapted to be telescopically received at one end within said opposite open ends of said at least one pair of side members of said first frame section.

28. The tree stand apparatus of claim 27 wherein said second frame section comprises a V-shaped member having a base and a pair of legs, said pair of legs forming the pair of side members of said second frame section which are telescopically received within the open ends of the at least one pair of side members of said first frame section.

29. The tree stand of claim 28 wherein each of said pair of side members of said second frame is also formed as a rectangularly shaped tube at the ends of said second frame side members at which said second frame side members are received within said first frame side members.

30. The tree stand apparatus of claim 29 wherein said second frame section further comprises a cross support bar disposed perpendicular to said second frame section side members, extending therebetween and firmly connected thereto, and being spaced apart from the base of the V-shaped member, so as to provide rigidity to said second support frame.

31. The tree stand apparatus of claim 30 wherein the foot supporting platform comprises a strong wire mesh firmly connected to the second frame section at an upper side thereof when said foot supporting section is in position on a tree for climbing and when in use on a tree.

32. The tree stand apparatus of claim 29 further including means provided on said two frame sections for locking said two frame sections in the assembled state.

33. The tree stand apparats of claim 32 wherein said two frame sections comprise a first frame section which is connected to said tree gripping means, a second frame section detachably connected to said first frame section, and carrier means connected to said first frame section for carrying the second frame when the frame is in its disassembled, reduced length, state.

34. The tree stand apparats of claim 33 further comprising means for locking said second frame section to said carrier means.

35. The tree stand apparatus of claim 27 further including carrier means connected to said first frame section for carrying the second frame when the frame is in its disassembled, reduced length state wherein said carrier means comprises a pair of rectangularly shaped, open end tubes, one of each of which is firmly connected to one of each of said at least one pair of first frame side members, and said pair of second frame side members is adapted to be telescopically received within said pair of carrier tubes.

36. The tree stand apparatus of claim 35 further including locking means provided on said carrier tubes and said second frame side members for locking said second frame side members to said first frame side members in the disassembled state.

37. The tree stand apparats of claim 27 wherein said first frame section further comprises first and second cross support bars disposed perpendicuarly to said at least one pair of first frame side members extending between said at least one pair of first side members and firmly connected thereto, said first and second cross support bars being spaced apart from one another, so as to provide additional rigidity to said first frame section.

38. The tree stand apparatus of claim 37 wherein said first frame further comprises a longitudinal support bar, disposed parallel to and substantially equidistantly between said at least one pair of first side members, said longitudinal support bar extending between and being firmly connected to said first and second cross support bars, so as to provide additional rigidity to said first support section.

39. The tree stand apparatus of claim 38 wherein the foot supporting platform comprises a strong wire mesh firmly connected to the first frame section at an upper side thereof when said foot supporting section is in position on a tree for climbing and when in use on a tree.

40. The tree climbing apparatus of claim 37 wherein said means for gripping a tree connected said first frame section comprises a V-shaped yoke firmly connected to and extending between said first frame side members, and also firmly connected to one of said first and second cross support members.

41. The tree stand apparatus of claim 2 further comprising an additional pair of side members, additional means for gripping a tree connected at one end of said additional pair of side members, each of the side members of said additional pair of side members being pivotally connected at the opposite end of said additional pair of side members to one of the opposite ends of the side members of said at least one pair of side members.

42. The tree stand apparatus of claim 41 including means for angular adjustment of the at least one pair of side members and the additional pair of side members with respect to one another between an expanded position in which the two pairs of side members are angularly disposed with respect to one another for climbing and use as a tree stand, and a collapsed position in which the two pairs of side members lie side by side for transporting and storing the tree stand apparatus.

43. The tree stand apparatus of claim 42 wherein the angular adjustment means comprises a pair of telescoping members for telescopic engagement within the one end of the at least one pair of side members and a pair of struts pivotally connected at one end to said pair of telescoping members and at the other end to said pair of additional side members.

44. The tree stand apparatus of claim 43 further comprising means for locking said two pairs of side members in said expanded position.

45. The tree stand apparatus of claim 44 wherein said locking means comprises corresponding apertures on said pair of telescoping members and said at least one pair of side members, and a spring-biased pin protruding from said apertures.

46. The tree stand apparatus of claim 41 wherein the additional tree gripping means comprises a V-shaped bar adjustably connected to said additional pair of side members at said one end of said additional pair of side members.

47. The tree stand apparatus of claim 41, further including a ball firmly connected to said additional pair of side members at an upper side thereof when said foot supporting section is in position on a tree for climbing and when in use on a tree, thereby enabling a user to change the position of foot supporting on the tree.

48. The tree stand apparatus of claim 3 wherein said means carried by said frame permitting separation of said two frame sections includes means for locking said two frame sections in the assembled state.

49. The tree stand apparatus of claim 48 in which said locking means includes corresponding apertures formed in said first and second frame side members, and a spring-biased pin protruding from said apertures.

* * * * *

UNITED STATES PATENT AND TRADEMARK OFFICE
CERTIFICATE OF CORRECTION

PATENT NO. : 5,090,504

DATED : February 25, 1992

INVENTOR(S) : Joseph A. Amacker

It is certified that error appears in the above-identified patent and that said Letters Patent is hereby corrected as shown below:

Column 8, claim 1, line 49, "setting" should be --seating--.

Column 9, claim 4, line 57, "apparats" should be --apparatus--.

claim 4, line 59, "tues" should be --tubes--.

Column 10, claim 6, line 6, "A" should be --The--.

Column 12, claim 33, line 32, "apparats" should be --apparatus--.

Column 12, claim 34, line 39, "apparats" should be --apparatus--.

UNITED STATES PATENT AND TRADEMARK OFFICE
CERTIFICATE OF CORRECTION

PATENT NO. : 5,090,504

DATED : February 25, 1992

INVENTOR(S) : Joseph A. Amacker

It is certified that error appears in the above-identified patent and that said Letters Patent is hereby corrected as shown below:

Column 12, claim 37, line 57, "apparats" should be --apparatus--.
Column 13, claim 41, line 18, "2" should be --27--.

Signed and Sealed this

Twenty-fifth Day of May, 1993

Attest:

MICHAEL K. KIRK

Attesting Officer

Acting Commissioner of Patents and Trademarks